United States Patent
Tuffin

(10) Patent No.: US 8,873,386 B2
(45) Date of Patent: Oct. 28, 2014

(54) METHOD AND SYSTEM FOR REGULATING REBOOT TRAFFIC IN A TELECOMMUNICATIONS NETWORK

(75) Inventor: Stephane Tuffin, Rospez (FR)

(73) Assignee: France Telecom, Paris (FR)

( * ) Notice: Subject to any disclaimer, the term of this patent is extended or adjusted under 35 U.S.C. 154(b) by 507 days.

(21) Appl. No.: 13/131,588

(22) PCT Filed: Nov. 24, 2009

(86) PCT No.: PCT/FR2009/052272
§ 371 (c)(1),
(2), (4) Date: May 26, 2011

(87) PCT Pub. No.: WO2010/061119
PCT Pub. Date: Jun. 3, 2010

(65) Prior Publication Data
US 2011/0228671 A1    Sep. 22, 2011

(30) Foreign Application Priority Data

Nov. 26, 2008 (FR) ...................................... 08 58019

(51) Int. Cl.
| | |
|---|---|
| H04L 1/00 | (2006.01) |
| H04L 29/14 | (2006.01) |
| H04L 12/911 | (2013.01) |
| H04L 29/06 | (2006.01) |

(52) U.S. Cl.
CPC ............ *H04L 65/1073* (2013.01); *H04L 69/40* (2013.01); *H04L 47/824* (2013.01); *H04L 47/746* (2013.01)
USPC .......................................... 370/230; 370/242

(58) Field of Classification Search
None
See application file for complete search history.

(56) References Cited

U.S. PATENT DOCUMENTS

| | | | |
|---|---|---|---|
| 6,751,668 B1* | 6/2004 | Lin et al. ...................... | 709/227 |
| 2008/0031258 A1 | 2/2008 | Acharya et al. | |
| 2008/0250156 A1* | 10/2008 | Agarwal et al. ............... | 709/235 |
| 2009/0097398 A1* | 4/2009 | Belinchon Vergara et al. ............................. | 370/216 |

FOREIGN PATENT DOCUMENTS

| | | |
|---|---|---|
| EP | 1 528 818 | 5/2005 |
| WO | WO 2007/130922 | 11/2007 |
| WO | WO 2008/085010 | 7/2008 |

OTHER PUBLICATIONS

M. Boucadair et al., "Enhancing the Serviceability and the Availability of IMS-Based Multimedia Services: Avoiding Core Service Failures", Next Generation Mobile Applications, Services and Technologies, pp. 444-449, Sep. 16, 2008.

* cited by examiner

*Primary Examiner* — Kevin C. Harper
(74) *Attorney, Agent, or Firm* — Cozen O'Connor

(57) ABSTRACT

A method of regulating traffic in a telecommunications network, including a first step of detecting a fault affecting a node or a link of the network. The second step below is then executed: the nodes located immediately upstream of said node/link that experienced the fault forward to the latter the registration requests sent by users of the network, to the extent that the throughput of said registration requests is below a predetermined clipping threshold associated with the registration requests; if the throughput of registration requests exceeds said clipping threshold, the excess requests are not forwarded to the node/link that experienced the fault, and the network sends to each user that sent a request refused in this way, a response prompting that user to observe a time-out period, said response specifying the recommended duration of said time-out period. Application in particular to IP networks using SIP signaling protocols.

15 Claims, 1 Drawing Sheet

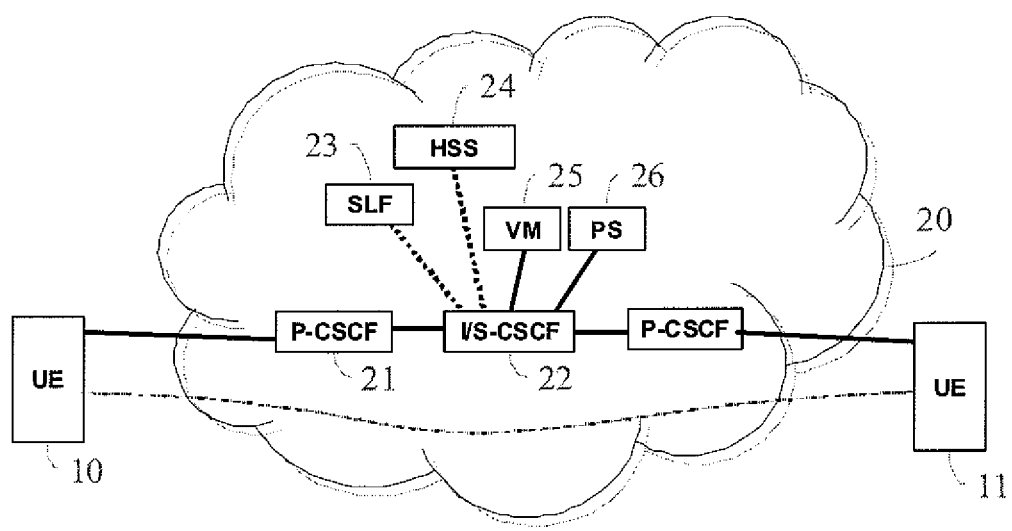

US 8,873,386 B2

METHOD AND SYSTEM FOR REGULATING REBOOT TRAFFIC IN A TELECOMMUNICATIONS NETWORK

RELATED APPLICATIONS

This is a U.S. national stage of application No. PCT/FR2009/052272, filed on Nov. 24, 2009.

This patent application claims the priority of France patent application no. 08/58019 filed Nov. 26, 2008, the disclosure content of which is hereby incorporated by Reference.

FIELD OF THE INVENTION

The present invention relates to the means provided in a telecommunications network to deal with a partial or complete fault of the network. It relates particularly (but not exclusively) to networks, for example Internet Protocol (IP) networks, able to use sophisticated session control protocols such as the H.323 protocol and the Session Initiation Protocol (SIP).

BACKGROUND OF THE INVENTION

IP networks enable broadcasting of conversational data (Voice Over IP, Content Sharing, Presence, Instant Messaging, etc.).

The designation H.323 covers a set of protocols for transmission of voice, image and data over IP (for more information, see the on-line encyclopedia Wikipedia). These protocols were developed by the ITU-T. They can be grouped into three categories: signaling, codec (coder-decoder) negotiation, and information transport.

The SIP is defined by the IETE in the document RFC 3261. This protocol makes it possible to set up, modify and terminate multimedia sessions in a network using the Internet Protocol. The SIP also allows event notification procedures and sending information outside the context of a session. It is widely used for instant messaging service commands. Thus in an SIP environment there exist different types of calls such as session set-up requests and requests exchanged outside of any dialogue.

These sophisticated session control protocols make use, in particular, of signaling messages, which are messages enabling a terminal to request a connection with another terminal, and messages signaling that a telephone line is busy, or that the called telephone is ringing, or that the telephone is connected to the network and may be contacted in such or such a manner.

The invention relates particularly (but not exclusively) to IP Multimedia Subsystem (IMS) infrastructures. The IMS is defined by the standards bodies 3GPP (3rd Generation Partnership Project) and TISPAN (Telecommunications and Internet Converged Services and Protocols for Advanced Networking). It is a network architecture introduced by the 3GPP for mobile networks, and then adopted by TISPAN for fixed networks. This architecture enables dynamic setting up and control of multimedia sessions between two clients and reservation of resources at the level of the multimedia stream transport network. It also manages the interaction of services. At present the IMS allows access to telephone, videophone, presence, and instant messaging services.

When a user wishes to obtain the benefit of services offered by an IP network such as those described above, they send network signaling messages that may in particular include various types of request.

First, the user must register with the network. If the network is unable to link this registration and a previous registration (for example following a network fault or the terminal being switched off for longer than a predetermined expiration period), the registration is considered as being an initial registration. After an initial registration, the user must periodically (for example every hour) send the network a request to confirm that they wish to maintain their registration; the time interval between two such requests is referred to as a registration refresh period.

Moreover, if the network uses the SIP, users may subscribe to certain services by sending a corresponding request. The service may be an event notification service; for example, if a user has a voicebox on the network, the user may request to receive a notification from the network each time that a message is stored in that voicebox. The service may equally be a presence notification service, and so on. Following the initial subscription request, the terminal must periodically send the network a request to renew its subscription; the time interval between two such requests is referred to as the subscription refresh period.

The various states of the terminal-network system requesting periodic refreshing are commonly referred to as soft-states.

The applicable standards require the terminals to manage timers enabling them to send these refresh requests (registration or subscription refresh) automatically. When a user is registered on the network from a terminal (whether this refers to an initial registration or a refresh), the network informs the terminal of the registration refresh period required by the network operator. After initially registering, a terminal may send one or more initial subscriptions (for example message posting notification or presence notification), either automatically and immediately after initial registration, or else following an action of the user at the interface of the terminal; for each (initial or refresh) subscription, the network indicates to the terminal the refresh period required by the managers of the network for this subscription.

In this context, during normal operation of the network, the network receives initial registration and initial subscription requests and also receives registration and subscription refresh requests as and when network users connect and then renew their registrations and their subscriptions after the respective refresh periods. The processing capacity of the nodes of the network is obviously intended to accommodate the corresponding request reception frequency, in particular as a function of the usual number of network users. In many circumstances, and in particular with so-called "always-on" networks and services, in normal operation, the reconnection rate, and thus the initial rate of registration and subscription, is particularly low.

However, particular problems arise in this framework in the event of a partial or total fault of the network. Following a fault, terminals that have not succeeded in renewing their registrations and subscriptions all seek to implement an initial registration followed by one or more initial subscriptions. The rate at which terminals seek to effect initial registration depends on the programming of the terminals. In many circumstances the terminals apply a time-out period that is potentially (and usually) much shorter than the registration refresh period, which leads to a high rate of registration attempts. In other circumstances it is an action of the user at the interface of the terminal that triggers the registration attempt. It should be noted that in all circumstances the duration of this time-out period is not indicated by the network because under the present assumption the part of the network necessary for the usual processing of registration is then down; this time-out period is therefore chosen by the terminal or by the user. The network must therefore accommodate an abnormally high influx of requests, and all the more so as the duration of the fault increases; after rebooting, the network is congested and often incapable of processing all these requests. Moreover, after a vast set of initial registration requests have been met, the network must accommodate a new influx of requests coming from the same terminals at the end of the registration refresh period.

Application PCT 2007/130922 in the name of AT&T Corp. discloses a method of controlling registration request traffic in a server in a communications network. That method comprises the following steps: blocking all the input links to the server from a port of the network associated with the registration request traffic; unblocking at least one of said input links to the server from that port of the network, following configuration of the server to process registration requests; and repeating the unblocking step over time until all the input links from this port of the network are unblocked. For the unblocking step, it is preferably determined whether the server is configured to process registration requests at a rate conforming to a measured capacity of the server. In other words, after a fault of the server, the registration traffic to that server is progressively unblocked as and when the server progressively recovers its registration request processing capacities.

Accordingly, in the prior art, on rebooting the network, the terminals send their respective registration requests slightly offset relative to each other; as a function of its capacity (which may vary from one node to another), each node of the network processes the first requests that it receives. This being so, the load level of the nodes of the network rapidly increases until an overload results. Under those conditions, one or more nodes of the network fail to respond to the terminals in time, which terminals then consider that their registration request has failed. The terminals finding that their request has not been responded to wait before resubmitting a registration request, for a period depending on their programming; if the new registration request from a terminal is also rejected, then before being able to resubmit a new request, the terminal must again wait a certain period depending on its programming, and this process continues until all terminals affected by the fault and seeking to be reconnected have been able to achieve this.

Numerous timing algorithms are known for use by a terminal that has suffered a fault during an initial registration or registration refresh attempt.

Accordingly, the LiveBox terminals supplied by France Telecom are at present programmed to attempt to register every four minutes.

The proposal posted on the IETF website (draft-ietf-sip-outbound-16#section-4.5) defines an algorithm in which the waiting time observed by the terminal depends not only on the registration refresh period but also on the number of consecutive registration faults (to be more precise, the time period is doubled each time that the terminal suffers a new fault in its registration attempt, provided that the registration refresh period is not exceeded).

Known fault management methods are far from optimum where the waiting time suffered by terminals is concerned. Indeed:

1) as explained above, they rely on previous programming of the terminals; the terminals used to access services offered by a network operator are not necessarily programmed by the operator concerned;

2) the waiting time is determined as a function of the necessity to avoid saturating the lowest-capacity node or link of the network, in case it is precisely that node/link that fails; however, if the fault affects only one node/link of the network, that node/link will generally have processing capacity that is greater than the minimum capacity, and terminals connected thereto could therefore in theory be able to benefit from a shorter waiting time;

3) the waiting time is determined as a function of a standard fault duration; consequently, users suffer an excessive waiting time if the fault is relatively short; and 4) there is no provision for distinguishing between the different types of request (registration, event notification subscription, presence notification subscription, and so on); consequently, the risk of congestion is evaluated as a function of all the requests that are sent after a reboot; there is a lower priority for the managers of the network to satisfy subscription requests than to enable registration of all users wishing to register; the waiting period before the initial registration succeeds is therefore longer than if different waiting times were assigned to each type of request as a function of a respective degree of priority.

Thus the document entitled "SIP: Session Initiation Protocol" by J. Rosenberg et al. (IETF document RFC 3261, June 2002) proposes a Retry-After procedure in which a service server that is overloaded responds to clients that sent it service requests, by sending messages indicating rejection of those requests and prompting each of those clients to send a new request after a standard waiting time. However, that Retry-After procedure does not eliminate the congestion phenomenon referred to above: it merely postpones it to a later time. Moreover, as mentioned in the paper by M. Boucadair, P. Morand, L. Borges, and M. Tomsu entitled "Enhancing the Serviceability and the Availability of IMS-Based Multimedia Services: Avoiding Core Service Faults" (The Second International Conference on Next Generation Mobile Applications, Services and Technologies, IEEE Piscataway, N.J. USA (2008), that Retry-After procedure has the drawback that it is the overloaded server itself that reports its overloaded state to the clients concerned, which merely aggravates this overloaded state.

SUMMARY OF THE INVENTION

One aspect of the present invention provides a method of regulating traffic in a telecommunications network, including a first step of detecting a fault affecting a node or a link of the network. Said method is noteworthy in that the second step below is then implemented:

the nodes located directly upstream from said node/link that experienced the fault forward to the latter the registration requests sent by users of the network, to the extent that the throughput of said registration requests is below a predetermined clipping threshold associated with the registration requests; and if the throughput of registration requests exceeds said clipping threshold, the excess requests are not forwarded to the node/link that experienced the fault, and the network sends to each user that sent a request refused in this way, a response prompting that user to observe a time-out period, said response specifying the recommended duration of said time-out period.

Thus, according to an embodiment of the invention, beyond a certain throughput of registration requests received after detection of the fault, the excess requests are refused and the terminals that sent the refused requests are prescribed a certain time-out procedure. This avoids the node/link affected by a fault becoming saturated when it reboots, and thus enables a progressive return to normal traffic.

It should be noted that, in contrast to the teaching of document PCT 2007/130922 briefly described above, in which the clipping threshold associated with registration requests is progressively raised during rebooting, the clipping threshold associated with the registration requests has, according to an embodiment of the present invention, a predetermined value. This clipping threshold is preferably fixed at a value greater than or equal to the throughput of registration requests in normal traffic, so that the method of the invention becomes "transparent" after a return to normal—until another fault occurs in the communications network.

It is important to note that the duration of the time-out period of the invention is determined dynamically by the nodes of the network as a function of the exact nature of the fault (for example as a function of the location of the fault in the network or the request throughput affected). In contrast, in the prior art, the duration of the time-out period applied by the terminals is always determined according to standard a priori criteria, i.e. without knowing the exact nature of a future fault in the network.

By means of the invention, the time-out duration can be adjusted much more precisely than in the prior art, as explained in detail below.

According to particular features, the network sends to a user whose registration request was forwarded to a still-faulty node/link a response prompting that user to observe a time-out period, said response specifying the recommended duration for that time-out period.

Registration requests forwarded in accordance with the invention by a given node to a downstream node/link affected by a fault obviously fail if that downstream node/link is still faulty. By means of these provisions, the time-out duration can also be adjusted for terminals that sent such requests.

According to other particular features:
the nodes located immediately upstream of said node/link that experienced the fault forward to the latter the subscription requests of a particular type (for example message posting notification, presence notification, and so on), sent by users of the network, to the extent that the throughput of said requests is below a predetermined clipping threshold associated with subscription requests of this type; and
if the throughput of subscription requests of said predetermined type exceeds said clipping threshold, the excess requests are not forwarded to the node/link that experienced the fault, and the network sends to each user that sent a request refused in this way, a response prompting that user to observe a time-out period, said response specifying the recommended duration of said time-out period.

According to even more particular features, the network sends to a user whose subscription request of said type was forwarded to a still-faulty node/link a response prompting that user to observe a time-out period, said response specifying the recommended duration for that time-out period.

By means of these features, subscription requests may also be spaced out to prevent congestion of the network. There is thus obtained, overall, a significant reduction in the waiting times imposed on users to be able to register following a network fault.

According to other particular features, the respective clipping thresholds for registration and any subscription types are chosen as a function of respective priorities and so that the total throughput of requests forwarded as a result of this choice does not exceed the overall processing capacity of said node/link that experienced the fault in terms of registration and subscription requests on a reboot, i.e. the maximum throughput of registration and subscription requests that this node/link is capable of processing within signaling traffic characteristic of the first moments after the fault. It should be noted that signaling traffic has a composition that evolves as a function of the fault duration and that is different from normal traffic (call request messages, notification messages, registration refresh messages, and so on): the longer the duration of a fault, the more the composition of the reboot traffic differs from that of the normal traffic, because it comprises more and more initial registration and initial subscription requests; consequently, the processing capacity of a node/link for reboot traffic must be distinguished from the processing capacity of the same node/link for traffic in normal operation.

By means of these provisions, the waiting time suffered by users before their initial registration succeeds is affected by the subscription request traffic only to a degree that may be adjusted by the network operator by adjusting the respective clipping thresholds.

According to further particular features, the network has measured the duration of the fault and the respective recommended duration for registration requests or for subscription requests of a predetermined type is an increasing function of said fault duration, up to a respective predetermined upper limit.

By means of these features, it becomes possible to recommend to terminals whose request has failed (because it was not forwarded or because the faulty node was not capable of processing it) a respective time-out period of duration that depends on the exact duration of the fault. It should be noted that in the prior art a terminal connected to the network finds out that a node or a link is down only when it sends to that node/link a registration or subscription refresh request (which therefore goes unanswered); the user knows that the fault occurred more recently than the last successful refresh, but cannot tell exactly when; consequently, the waiting time programmed in the terminal may, where appropriate, be fixed as a proportion of a refresh period (usually of the order of one hour), but it is impossible to determine this waiting time as a function of the exact duration of the fault. In contrast, the above features make it possible to take into account with an accuracy that is not limited by anything except the (generally short) time taken to detect a fault in the network. By comparison with the prior art, a significant reduction is obtained in this way of the waiting times of the terminals, at least provided that the duration of the fault is short compared to the refresh periods.

In a correlated way, another aspect of the invention relates to a system for regulating traffic in a telecommunications network.

Thus it relates to a system having means for acting following detection of a fault affecting a node or a link of the network:
to cause nodes located directly upstream of said node/link that experienced the fault to forward to the latter the registration requests sent by users of the network, to the extent that the throughput of said registration requests is below a predetermined clipping threshold associated with the registration requests; and
if the throughput of registration requests exceeds said clipping threshold, to prevent the excess requests being forwarded to the node/link that experienced the fault, and to cause the network to send to each user that sent a request refused in this way, a response prompting that user to observe a time-out period, said response specifying the recommended duration of said time-out period.

According to particular features, the traffic regulation system includes means for sending to a user whose registration request was forwarded to a still-faulty node/link a response prompting that user to observe a time-out period, said response specifying the recommended duration for that time-out period.

According to further particular features, the traffic regulation system includes means for:

causing the nodes located immediately upstream of said node/link that experienced the fault to forward to the latter subscription requests of a predetermined type sent by users of the network to the extent that the throughput of said registration requests is below a predetermined clipping threshold associated with subscription requests of that type; and if the throughput of subscription requests of said predetermined type exceeds said clipping threshold, to prevent the excess requests being forwarded to the node/link that experienced the fault, and to cause the network to send to each user that sent a request refused in this way, a response prompting that user to observe a time-out period, said response specifying the recommended duration of said time-out period.

According to further particular features, the traffic regulation system includes means for sending to a user whose subscription request of said type was forwarded to a still-faulty node/link a response prompting that user to observe a time-out period, said response specifying the recommended duration for said time-out period.

According to further particular features, the respective clipping thresholds for registration and any subscription types are chosen as a function of respective priorities and so that the total throughput of requests forwarded as a result of this choice does not exceed the overall processing capacity of said node/link that experienced the fault in terms of registration and subscription requests on a reboot.

According to further particular features, the traffic regulation system includes means for measuring the duration of the fault and the respective recommended duration for registration requests or for subscription requests of a predetermined type is an increasing function of said fault duration, up to a respective predetermined upper limit.

The advantages offered by this traffic regulation system are essentially the same as those offered by the correlated methods briefly explained above.

It should be noted that it is possible to produce the traffic regulation system briefly described above in the context of software instructions and/or in the context of electronic circuits.

Another aspect of the invention relates to a telecommunications network node, for example a server-computer, that is part of a traffic regulation system as briefly described above.

Another aspect of the invention relates to a computer program downloadable from a communications network and/or stored on a computer-readable medium and/or adapted to be executed by a microprocessor, that is remarkable in that it includes instructions for executing the steps of any one of the traffic regulation methods briefly set out above when it is executed on a computer.

The advantages offered by this node and by this computer program are essentially the same as those offered by said methods.

BRIEF DESCRIPTION OF THE SINGLE DRAWING

Other aspects and advantages of the invention become apparent on reading the following detailed description of particular embodiments of the invention chosen by way of non-limiting example. The description refers to the accompanying FIGURE, which represents diagrammatically a system for providing multimedia services that is adapted to implement the invention.

DETAILED DESCRIPTION OF THE SINGLE DRAWING

The system shown in FIG. 1 is based on an IMS-type network architecture, presented above. The multimedia services offered by such a system may include telephony services, videotelephony services, content-sharing services, presence services, instant messaging services, or television services. These services are available to the user of a terminal (user equipment (UE)) 10 in a network 20 having an IP transport infrastructure and including IMS servers via which the terminal 10 is able to exchange SIP signaling messages and multimedia streams, in particular with another terminal (UE) 11, the terminals 10 and 11 being registered beforehand with the IMS servers of the network 20.

The terminals 10 and 11 are fixed or mobile terminals that have SIP signaling means and that may include means for reproducing an audiovisual content.

As FIG. 1 shows, this service provision system relies on a network 20 conforming to the IMS architecture defined by the 3GPP, including:

an IP transport infrastructure (not shown);

one or more I/S-CSCF routing servers combining an interrogating-call server control function and a serving-call server control function in the same server; an I/S-CSCF routing server 22 manages in particular the procedure for registering the terminal 10 in the network 20, routing signaling between the terminal 10 and the voicemail (VM) application server 25 and presence service (PS) application server 26 hosting the services to which the user of the terminal 10 subscribes, as well as routing to other terminals managed by the same IMS network, for example the terminal 11, and routing signaling between the IMS network 20 and other networks (not shown);

one or more proxy-call server control function (P-CSCF) servers; a P-CSCF server 21 is the SIP contact point of the terminal 10 in the IMS network; thus all SIP signaling exchanged between the terminal 10 and the I/S-CSCF routing server 22 managing the terminal 10 passes through this P-CSCF server 21;

one or more home subscriber server (HSS) type database servers; an HSS server 24 contains the profile of the user of the terminal 10 in terms of authentication, location, and subscribed services data;

optionally, a subscriber location function (SLF) server; an SLF server 23 is used in networks containing a plurality of HSS servers; this SLF server 23 is interrogated by the I-CSCF and S-CSCF functions to discover the address of the HSS server 24 hosting the data of the user of the terminal 10;

one or more voicemail (VM) application servers; a VM server 25 manages voicemail for the user of the terminal 10; in particular, the VM server 25 manages the subscription of the terminal 10 to the message posting/reading events of the user of this terminal, and notifies the terminal 10 of the occurrence of these events; and one or more presence (PS) application servers; a PS server 26 manages in particular the subscription of the terminal 10 to the presence events that the user of this terminal wishes to monitor, and notifies the terminal of the occurrence of these events.

The HSS database server 24 is consulted in particular:

by the I-CSCF function on registration of the terminal 10 in order to allocate a I/S-CSCF server 22 to the user of this terminal or to discover the I/S-CSCF server 22 already allocated to this user;

by the S-CSCF function on initial registration of the user of the terminal 10 in order to download data concerning the services to which this user subscribes, including in particular the detection points that enable the I/S-CSCF server 22 to determine which signaling message it must route to which application server (for example the VM server 25 and the PS server 26);

by the S-CSCF function on registering the user of the terminal 10, in order to inform the HSS server 24 of the setting up or extension of this user's registration with the I/S-CSCF server 22; and by the S-CSCF function, in order to recover the information necessary to authenticate the signaling sent by the user of the terminal 10.

The terminal 10 must be registered in the network 20 for the user of the terminal to be able to use on that terminal the services provided by the network 20. The procedure for initial registration of the terminal 10 with the network 20 is normally executed when starting the terminal (or an application installed on the terminal) by the user. A registration has a validity time that is time-limited. Under normal operating conditions, the terminal 10 must renew its registration automatically and periodically. These registration maintaining requests are referred to as "registration refresh" requests. In the SIP context, registration procedures use an "SIP REGISTER" request.

Some services, such as those of the VM server 25 and the PS server 26, rely on the terminal 10 subscribing to events (for example message posting/reading or presence events). The procedure for initially subscribing the terminal 10 to the network 20 is normally executed when starting up the terminal (or an application installed on the terminal) by the user, just after the initial registration procedure. An initial subscription procedure is executed for each type of event subscribed to (for example initial subscription to message posting/reading events is independent of initial subscription to presence events). An event subscription has a time-limited duration. This duration may be different for each type of event subscribed to, and is also independent of the registration validity time. Under normal operating conditions, the terminal 10 must renew its subscription or subscriptions to events automatically and periodically. These requests for maintaining event subscriptions are called "subscription refresh requests". In the SIP context, event subscription procedures use an "SIP SUBSCRIBE" request.

Different types of fault may render unavailable the services provided by the network 20 to the user of the terminal 10. In particular:

faults of type "A" the consequence of which is loss of data associated with the registration of the terminal 10 with the P-CSCF server 21, the I/S-CSCF server 22, or the HSS server 24;

faults of type "B" the consequence of which is blocking transmission of signaling between the terminal 10 and the P-CSCF server 21 or between the P-CSCF server 21 and the I/S-CSCF server 22 or between the I/S-CSCF server 22 and the SLF server 23 or between the I/S-CSCF server 22 and the HSS server 24 (this essentially concerns the IP transport infrastructure of the network 20).

For faults of type "A" or type "B", a terminal 10 attempts to refresh its registration during the fault if the duration of the fault is greater than or equal to the registration refresh period of the terminal 10; moreover, for fault durations shorter than the registration refresh period, the probability of a terminal attempting to refresh its registration during the fault is given by the fault duration divided by the registration refresh period (this assumes a regular distribution of the terminals in the registration refresh period). Under such circumstances, in known telecommunications systems:

either the terminal receives a fault response from the network;

or the terminal receives no response in an allotted time (32 seconds according to the IETF document RFC 3261), and deduces from this that registration refreshing has not succeeded.

In the above-mentioned situations, and in the situation of an initial registration fault caused by a network fault, the terminal 10 attempts to register with the network 20 until registration succeeds. To this end, the terminal 10 conventionally employs an algorithm prescribing a time-out period that the terminal must observe before attempting to register again, this time-out period having a duration less than or equal to the registration refresh period.

Clearly, for a given fault duration, the magnitude of the signaling traffic that a network node affected by the fault must process at the moment the fault is repaired is a decreasing function of said time-out period.

It is also clear that, again for a given fault duration, the time for which the terminal 10 must wait after the end of the fault to be registered is again, on average, an increasing function of the time-out period. The qualification "on average" refers to the fact that, for a given terminal, the time for which a terminal must, following a network fault, wait before being registered again depends on the time-out period and also on the time from which it attempts to register relative to the end of the fault. If by chance it attempts to register just after the end of the fault, and assuming that the network is not overloaded, it will almost certainly succeed in registering; in contrast, if it attempts to register just before the end of the fault, it waits the whole of the time-out period before attempting to register again.

As mentioned above, known algorithms used in terminals after a registration fault have the following disadvantages.

If the operator of the network 20 is not in complete control of these algorithms (for example in the situation of terminals purchased "off the shelf" by users or terminals where software updates are not monitored by the operator), the operator is not in a position to optimize the dimensioning of the nodes of their network and cannot enter into any undertaking as to the level of availability of the services rendered to users by the network 20.

A second drawback is that the location of the fault is not taken into account in these known algorithms, although it has a strong influence on the signaling traffic admissible by the network 20. The registration request processing capacity (in particular initial registration request) per managed user is usually greater on the P-CSCF server 21 than on the I/S-CSCF server 22, and greater on the I/S-CSCF server 22 than on the HSS server 24; for example, for a fault affecting the I/S-CSCF server 22, it is possible to accept more traffic than for a fault affecting the HSS server 24. Moreover, the different nodes of the same type (i.e. of P-CSCF or I/S-CSCF or SLF or HSS type) of a network 20 do not necessarily all manage the same number of users, as this number depends on the technique and policy for distributing load between the various nodes; thus if the number of users connected to a node affected by a fault is low, it is possible to accept for this node a signaling traffic per terminal greater than if the number of users connected to this node were high.

A third and final drawback is that no means are provided for dissociating sending by terminals of an initial "SIP REGISTER" request from the sending of an initial "SIP SUBSCRIBE" request (usually following on from an initial "SIP REGISTER" request), including when this "SIP REGISTER" request initial follows a succession of unsuccessful registration attempts.

The present invention eliminates the drawbacks referred to above. In the present embodiment of the invention, the node situated on the path of the SIP registration requests on the upstream side of the faulty node (i.e. the P-CSCF server 21, for example, if the I/S-CSCF server 22 is seen as down; the I/S-CSCF server 22 if the HSS server 24 is seen as down) "controls" the spacing of the registration and subscription requests sent to the faulty node as a function of:
   the fault duration as observed by said upstream node;
   the throughput of reboot traffic routed by the upstream node to the faulty node, including any other upstream nodes connected to the faulty node and the percentage of traffic to the faulty node allocated to each upstream node; and
   the reboot traffic type, so as to control differently rebooting of the initial registration traffic and rebooting of the initial subscription traffic.

It should be noted that there exist in the prior art various ways to enable a node to detect fault of another node of the network. Such means may for example rely on detecting the absence of reception of signaling messages exchanged between the two nodes during a certain period of time. To effect such detection, it is notably possible to rely on the signaling messages sent by the terminals and normally forwarded by the nodes or on the sending of signaling messages exchanged only between two nodes or on a combination of these two methods. For its part, detection of the end of the fault relies on the reception of signaling messages coming from the node previously considered faulty.

In the present embodiment of the invention, if an "upstream" node detects that a node just downstream of it is faulty, the upstream node "clips" requests going to the "downstream" node (i.e. does not transmit the excess requests).

Consider by way of example fault of an I/S-CSCF server connected to 5 P-CSCF servers with traffic going to the I/S-CSCF server equally distributed between the 5 P-CSCF servers; assume further that the processing capacity of the I/S-CSCF server in terms of requests on a reboot is 8 requests per second: under the above conditions, the clipping threshold for each P-CSCF server must at most be equal to 8/5 requests per second.

Any software and/or hardware means known to the person skilled in the art may be used to implement clipping.

Moreover, where registration requests and the various types of subscription available (or optionally of a plurality of approved types) are concerned, said upstream node clips the throughput of these requests going to the downstream node/link in accordance with respective clipping thresholds associated with those requests. These clipping thresholds are chosen as a function of the respective priorities granted by the operator of the telecommunications network to these types of subscription or registration request. In other words, the more important the request type is considered for quality of service, the higher the chosen clipping threshold to favor the processing of requests of this type by the node/link that suffered the fault as soon as it reboots; it goes without saying that, given the limited overall processing capacity of said node/link, favoring one type of request is necessarily to the detriment of the other types of request. The limiting condition is to choose to transmit only registration requests.

A distinction may then be made between two situations.

The first situation concerns non-clipped requests transmitted when the previously faulty downstream node/link has rebooted: these requests simply take their normal course.

The second situation concerns non-clipped requests transmitted when the downstream node is still faulty and also clipped requests: these requests trigger a response from the upstream node requesting the sending terminal to resubmit the request after a certain time-out period. To be more precise, with non-clipped requests, this response is preferably sent slightly before the expiry of a time period equal to the period at the end of which the terminals find out that a request has failed (32 seconds according to IETF document RFC 3261); with clipped requests, the response is preferably sent immediately.

The prescribed duration for this time-out period generally depends on the respective request type. This duration preferably increases with the fault duration, but is limited upwardly by the respective refresh period, i.e. the registration refresh period or the refresh period for the type of subscription concerned. For example, if the refresh period corresponding to a certain type of request is 1800 seconds, the duration of the time-out period could be equal to the smaller of the following two values:
   1800 seconds, and
   slope×fault duration,
where "slope" designates a chosen value making it possible to spread to a greater or lesser degree the sending of requests by the terminals.

Implementing the invention in nodes of the telecommunications network (to be more precise the P-CSCF and I/S-CSCF servers in the embodiment described above) may be effected by means of software and/or hardware components. For example, the component used for clipping may be a prior art dedicated network card.

The software components could be integrated into a conventional network node management computer program. This is why, as indicated above, the present invention also provides a data processing system. That data processing system conventionally includes a central processor unit controlling a memory by means of signals, as well as an input unit and an output unit. Moreover, this data processing system may be used to execute a computer program include instructions for executing the traffic regulation method of the invention.

The invention also provides a computer program downloadable from a communications network including instructions for executing steps of a traffic regulation method of the invention when it is executed on a computer. This computer program may be stored on a computer-readable medium and adapted to be executed by a microprocessor.

This program may use any programming language and take the form of source code, object code, or a code intermediate between source code and object code, such as a partially-compiled form, or any other desirable form.

The invention also provides a computer-readable information medium containing instructions of a computer program as referred to above.

The information medium may be any entity or device capable of storing the program. For example, the medium may include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which may be routed via an electrical or optical cable, by radio or by other means. The program of the invention may in particular be downloaded over an Internet-type network.

Alternatively, the information medium may be an integrated circuit in which the program is incorporated, the circuit being adapted to execute the traffic regulation method of the invention or to be used in its execution.

The invention claimed is:

1. A method of regulating traffic in a telecommunications network, including a first step of detecting a fault affecting a node or a link of the network, wherein the following second step is then executed:
    nodes located directly upstream from a node/link that experienced the fault forward to the node/link that experienced fault registration requests sent by users of the telecommunications network, to an extent that a throughput of said fault registration requests is below a predetermined clipping threshold associated with the fault registration requests, the predetermined clipping threshold being determined before the first step of detecting the fault;
    if the throughput of the fault registration requests exceeds said predetermined clipping threshold, excess fault registrations requests are not forwarded to the node/link that experienced the fault, and the telecommunications network sends to each user that sent a request that is not forwarded to the node/link that experienced the fault, a response prompting each said user to observe a time-out period, said response specifying a recommended duration of said time-out period;
    wherein the telecommunications network has measured a duration of the fault and a respective recommended duration for fault registration requests or for subscription requests of a predetermined type is an increasing function of said duration of the fault, up to a respective predetermined upper limit.

2. The traffic regulation method according to claim 1, wherein the telecommunications network sends to a user whose fault registration request was forwarded to a still-faulty node/link a response prompting that user to observe the time-out period, said response specifying a recommended duration for that time-out period.

3. The traffic regulation method according to claim 1, wherein:
    nodes located immediately upstream of the node/link that experienced the fault forward to the node/link that experienced the fault the subscription requests of a predetermined type sent by users of the telecommunications network, to the extent that the throughput of said subscription requests is below a predetermined clipping threshold associated with subscription requests of this type; and
    if the throughput of subscription requests of said predetermined type exceeds said clipping threshold, excess subscription requests are not forwarded to the node/link that experienced the fault, and the telecommunications network sends to each user that sent a subscription request that is not forwarded to the node/link that experienced the fault, a response prompting each said user to observe the time-out period, said response specifying a recommended duration of said time-out period.

4. The traffic regulation method according to claim 3, wherein the telecommunications network sends to a user whose subscription request of said predetermined type was forwarded to a still-faulty node/link a response prompting the user to observe the time-out period, said response specifying the recommended duration for that time-out period.

5. The traffic regulation method according to claim 1, wherein respective predetermined clipping thresholds for registration and any subscription types are chosen as a function of respective priorities and so that a total throughput of requests forwarded as a result of this choice does not exceed an overall processing capacity of said node/link that experienced the fault in terms of registration and subscription requests on a reboot.

6. The traffic regulation method according to claim 1, wherein said respective predetermined upper limit is equal to a respective refresh period.

7. A system for regulating traffic in a telecommunications network, the system including means for measuring a duration of a fault and means for acting following detection of a fault affecting a node or a link of the telecommunications network and:
    to cause nodes located directly upstream of a node/link that experienced the fault to forward to the node/link that experienced fault registration requests sent by users of the telecommunications network to an extent that a throughput of said fault registration requests is below a predetermined clipping threshold associated with the fault registration requests, the predetermined clipping threshold being determined before the detection of the fault; and
    if the throughput of the fault registration requests exceeds said predetermined clipping threshold, to prevent excess fault registration requests being forwarded to the node/link that experienced the fault, and to cause the telecommunications network to send to each user that sent a request that is not forwarded to the node/link that experienced the fault, a response prompting each said user to observe a time-out period, said response specifying a recommended duration of said time-out period;
    wherein a respective recommended duration for fault registration requests or for subscription requests of a predetermined type is an increasing function of a duration of the fault, up to a respective predetermined upper limit.

8. The traffic regulation system according to claim 7, further comprising:
    means for sending to a user whose fault registration request was forwarded to a still-faulty node/link a response prompting that user to observe the time-out period, said response specifying a recommended duration for that time-out period.

9. The traffic regulation system according to claim 7, further comprising:
    means for:
    causing nodes located immediately upstream of the node/link that experienced the fault to forward to the node/link that experienced the fault subscription requests of a predetermined type sent by users of the telecommunications network to the extent that the throughput of said fault registration requests is below the predetermined clipping threshold associated with subscription requests of this type; and
    if the throughput of subscription requests of said predetermined type exceeds said predetermined clipping threshold, to prevent excess subscription requests being forwarded to the node/link that experienced the fault, and to cause the telecommunications network to send to each user that sent a subscription request that is not forwarded to the node/link that experienced the fault, a response prompting each said user to observe the time-out period, said response specifying a recommended duration of said time-out period.

10. The traffic regulation system according to claim 9, further comprising:
   means for sending to a user whose subscription request of said predetermined type was forwarded to a still-faulty node/link a response prompting the user to observe the time-out period, said response specifying the recommended duration for said time-out period.

11. The traffic regulation system according to claim 7, wherein respective predetermined clipping thresholds for registration and any subscription types are chosen as a function of respective priorities and so that a total throughput of requests forwarded as a result of this choice does not exceed an overall processing capacity of said node/link that experienced the fault in terms of registration and subscription requests on a reboot.

12. The traffic regulation system according to claim 7, wherein said respective predetermined upper limit is equal to a respective refresh period.

13. A node of a telecommunications network, wherein the node forms part of the system for regulating traffic according to claim 7.

14. A non-removable, partially removable or totally removable non-transitory data storage means containing electronic data processing program code instructions for executing the steps of the method for regulating traffic according to claim 1.

15. A microprocessor storing a computer program, the computer program comprising instructions for executing the steps of the method for regulating traffic according to claim 1, when executed on the microprocessor.

* * * * *